(12) United States Patent
Yamamoto

(10) Patent No.: US 7,136,669 B2
(45) Date of Patent: *Nov. 14, 2006

(54) RADIO COMMUNICATION APPARATUS

(75) Inventor: Etsuji Yamamoto, Tokyo (JP)

(73) Assignee: Vertex Standard Co., Ltd., Tokyo (JP)

( * ) Notice: Subject to any disclaimer, the term of this patent is extended or adjusted under 35 U.S.C. 154(b) by 123 days.

This patent is subject to a terminal disclaimer.

(21) Appl. No.: 10/935,034

(22) Filed: Sep. 7, 2004

(65) Prior Publication Data

US 2005/0026645 A1    Feb. 3, 2005

Related U.S. Application Data

(63) Continuation of application No. 09/997,119, filed on Nov. 28, 2001, now Pat. No. 6,788,955.

(30) Foreign Application Priority Data

Nov. 29, 2000    (JP) .............................. 2000-363747

(51) Int. Cl.
*H04B 1/00*    (2006.01)

(52) U.S. Cl. ............................. 455/550.1; 455/552.1; 455/567; 455/412.2

(58) Field of Classification Search ................ 455/403, 455/412.1, 412.2, 414.1, 414.2, 432.3, 417, 455/88, 550.1, 418, 420, 90.1, 90.3, 575.6, 455/566, 556.1, 514, 557, 567

See application file for complete search history.

(56) References Cited

U.S. PATENT DOCUMENTS

| | | |
|---|---|---|
| 5,274,802 A | 12/1993 | Altine |
| 5,656,802 A | 8/1997 | Aoki |
| 6,075,983 A | 6/2000 | Kumagai |
| 6,463,278 B1 | 10/2002 | Kraft et al. |
| 6,519,481 B1 | 2/2003 | Kobayashi |
| 2002/0097262 A1* | 7/2002 | Iwase et al. ................. 345/744 |

* cited by examiner

*Primary Examiner*—Jean Gelin
(74) *Attorney, Agent, or Firm*—Fulwider Patton LLP

(57) ABSTRACT

A radio communication apparatus including an operator control section with at least one actuator for appointing a function setting that may be recorded in a first data structure and thereafter detected and recorded in a second data structure wherein a microprocessor may compare the two settings and issue a modification notification indicating that the initial setting has been changed.

21 Claims, 5 Drawing Sheets

| FUNCTION | Dset | Dref | |
|---|---|---|---|
| MODE | AM | AM | |
| FREQ(T) | 144.86MHz | 145.53MHz | ← |
| FREQ(R) | 144.86MHz | 144.94MHz | ← |
| VFO/MR | VFO | VFO | |
| STEP | 10KHz | 10KHz | |
| DSP | NB | NB | |
| AF VOL | 32.05dB | 48.74dB | ← |
| SQL | ON | ON | |
| RF GAIN | 40dB | 40dB | |
| CLAR | OFF | ON | ← |
| IF SHIFT | ON | OFF | ← |
| ⋮ | ⋮ | ⋮ | |

RADIO COMMUNICATION APPARATUS

This is a continuation application of U.S. Ser. No. 09/997,119, now U.S. Pat. No. 6,788,955 filed on Nov. 28, 2001, entitled Radio Communication Apparatus, which is incorporated by reference herein in its entirety.

BACKGROUND OF THE INVENTION

1. Field of the Invention

The present invention relates to a radio communication apparatus. More specifically, the invention relates to an expansion of the functional capabilities of the radio communication apparatus. The expansion provides for the checking of the various functional settings previously made for performing communication to determine if any of the settings have been modified at a later stage before resumption of the communication, and if so, notification is made to facilitate restoration of the functional settings to their original states.

2. Description of the Related Art

In recent years, most radio communication apparatuses contain a microcomputer circuit therein to allow control of various functions by manipulating switches and dials.

Thus, a plurality of push-button switches and dial knobs are provided for an operation panel of a radio communication apparatus. A lot of radio communication apparatuses employ a system of displaying on their liquid display section settings associated with main functions.

To take an example, as shown in FIG. 6, a main unit 1 of an amateur radio transmitter-receiver has a plurality of switches and knobs disposed in a rational manner for ease of operation. Further, several switches are provided in a microphone 2 for enabling quick operation. The specific functions of these switches and knobs are as follows:

(1) An AF volume knob 11 adjusts a received sound volume.
(2) An SQL (squelch) knob 12 is used for eliminating noise in the absence of a signal.
(3) The SQL knob 12 serves as an RF GAIN knob 13 as well. The RF GAIN knob 13 is used to adjust a gain of a receiving section. According to a selected menu mode, switching is performed between the RF GAIN knob 13 and the SQL knob 12.
(4) A CLAR (clarifier) switch 14 is employed when a SELECT knob 15 is used to perform a CLAR function of changing a receiving frequency alone without changing a transmitting frequency.
(5) The SELECT knob 15 is used to perform functions of setting a frequency, selecting a memory channel, setting an IF shift, clarification, and selecting a menu mode by switching, according to an operation status.
(6) A multifunction switch 16 is used to perform various functions, and the assigned functions to be performed are switched by a FUNC switch 18.
(7) A DSP (digital signal processor) switch 17 controls a built-in DSP to perform switching between a DSP NR, a DSP AUTO NOTCH, a DSP BPF mode. The DSP NR is a function of canceling a succession of noise in the frequency band, and the DSP AUTO NOTCH is a function of reducing a beat tone of a received signal. The DSP BPF is a function of controlling a lower cut-off frequency a higher cut-off frequency separately in a BPF function of the DSP to remove radio interference and compensate a receiving frequency response, and adjusting a BPF center frequency to follow a BFO pitch in a CW mode.
(8) A FUNC (function) switch 18 switches the assigned functions of the multifunction switch 16.
(9) UP and DWN (down) switches 19 switches operation bands.
(10) A MODE switch 20 switches emission modes, and each time the switch is turned ON, the mode is sequentially switched from an LSB, a CW, an AM, to an FM mode. Further, each time the switch is continuously pressed for five seconds or longer, the mode is sequentially switched from a USB, a CWR, a DIG, to a WFM mode.
(11) An indicator lamp 21 shows a transmission/reception status. The indicator lamp 21 turns red in a transmit mode and turns green in a receive mode.
(12) Though a DIAL (dial) knob 22 is mainly used to make a frequency adjustment, it also makes various adjustments according to functional settings made by the FUNC switch 18.
(13) A PWR (power) switch 23 turns power ON or OFF.
(14) A VFO/MR switch 24 performs switching between a VFO scanning function and a memory channel scanning function.
(15) A STEP switch 25 switches steps during the frequency adjustment.
(16) A HOME switch 26 calls various frequencies used frequently.
(17) A LOCK switch 27 locks settings that have been made by using switches and knobs on the operation panel.
(18) A PTT switch 28 sets the transmit mode when turned ON, and sets the receive mode when turned OFF.
(19) UP and DWN (down) switches 29 perform the same control as the UP and DOWN switches 19 in the main unit 1.
(20) A LOCK switch 30 performs the same control as the LOCK switch 27 in the main unit 1.
(21) An ACC switch 31 calls a home channel of a frequency band being currently used.
(22) A P switch 32 performs the same control as the VFO/MR switch 24 in the main unit 1.
(23) P1 and P2 switches 33 are used for a shift from a lower frequency band to a higher frequency band in a step set by the STEP switch 25.

Recently, various functions of a radio communication apparatus are realized or utilized in the above-mentioned manner by manipulation of a single switch or knob or a combination of any of switches and knobs. Essential data in functional settings made by this manipulation is displayed on a liquid crystal display section (indicated by reference numeral 40 in FIG. 6) in the form of numbers and icons.

In the case of the amateur radio transmitter-receiver described above, the number of functions set by various manipulations often exceeds one hundred functions, and even if they are confined to the main functions used frequently during normal operation, the number of the main functions often exceeds a dozen.

Accordingly, even a skilled operator seldom correctly grasps all of the functional settings during operation. Let us assume the case where communication has been suspended for a change of operator and then communication is resumed by the former operator. In this case, complete restoration of the original functional setting states is extremely difficult, if any of the modifications in the functional settings has been made after the change of operator.

If the settings made by using the switches and knobs are locked by means of the LOCK switch 27, the operation by the subsequent operator becomes invalid. Thus, a modification in the functional settings can also be made invalid. However, when communication is made by the subsequent operator, switching of the transmit and receive modes by means of the PTT switch 28 alone becomes valid. Functional settings to other radio modes and frequencies, and communication with a change in the received sound volume, however, cannot be performed.

Further, by means of the HOME switch 26, the return to several home channels alone can be performed. However, these channels have to be registered in advance, and a channel to be used is changed frequently in a step-by-step manner during practical operation. For this reason, use of the HOME switch is not effective in solving the problem described above.

Further, in automobile-mounted radio communication apparatuses, an unintended erroneous operation tends to occur. To take an example, inadvertent touching on a dial instead of a switching operation to cause a change in frequency can be pointed out.

In such a case, in order to continue the communication that has been being performed so far, it is necessary to urgently restore the functional settings to their original states. However, the operator is not informed of the immediately preceding functional settings, so that in this situation, he is often at a loss as to what to do.

SUMMARY OF THE INVENTION

In accordance with an embodiment of the present invention, a radio communication apparatus is provided with an operator section having at least one actuator associated with a control function and selectively operable to appoint a function setting for the control function and a data storage area having a first data structure for storing a baseline function setting appointed by the actuator and a second data structure for storing a detected function setting. The radio communication apparatus also includes a microprocessor in communication with the data storage area and the operator control section with the microprocessor being selectively operable to enter into a first mode to record the baseline function setting corresponding to the control function in the first data structure and to enter into a second mode subsequent to the first mode to record the detected function setting corresponding to the control function in the second data structure and compare the function settings in the data structures and, upon a comparison of non-coinciding said data structures, an indicator element responsive to a command signal generated from said microprocessor issues a modification notification.

In another aspect of the present invention, the operator control section includes a plurality of actuators with each actuator being associated with a control function and a plurality of baseline control settings are compared with a plurality of detected control settings to determine if any modifications to the baseline control have taken place.

In yet another aspect of the present invention, a restoration actuator is provided and upon determination of non-coinciding data structures, actuation of the restoration actuator resets the detected function settings to match the baseline function settings.

Another feature of the present invention is the incorporation of a display for displaying changed settings and a scrolling actuator to bring up additional menu items on the display menu.

In another aspect of the present invention, pre-existing data in a data structure is overwritten upon entry of the first or second modes.

In one embodiment of the present invention, the indicator is an illumination device that flashes upon a comparison of non-coinciding data structures.

In yet another feature of the present invention, a timer element is provided to initiate a delay wherein an erroneous function setting may be retracted within a pre-determined time period.

Other aspects of the present invention will become apparent with further reference to the following drawings and specification.

DETAILED DESCRIPTION OF THE PREFERRED EMBODIMENTS

Now, an embodiment of a radio communication apparatus according to the present invention will be described in detail with reference to the appended drawings.

Figure 1:
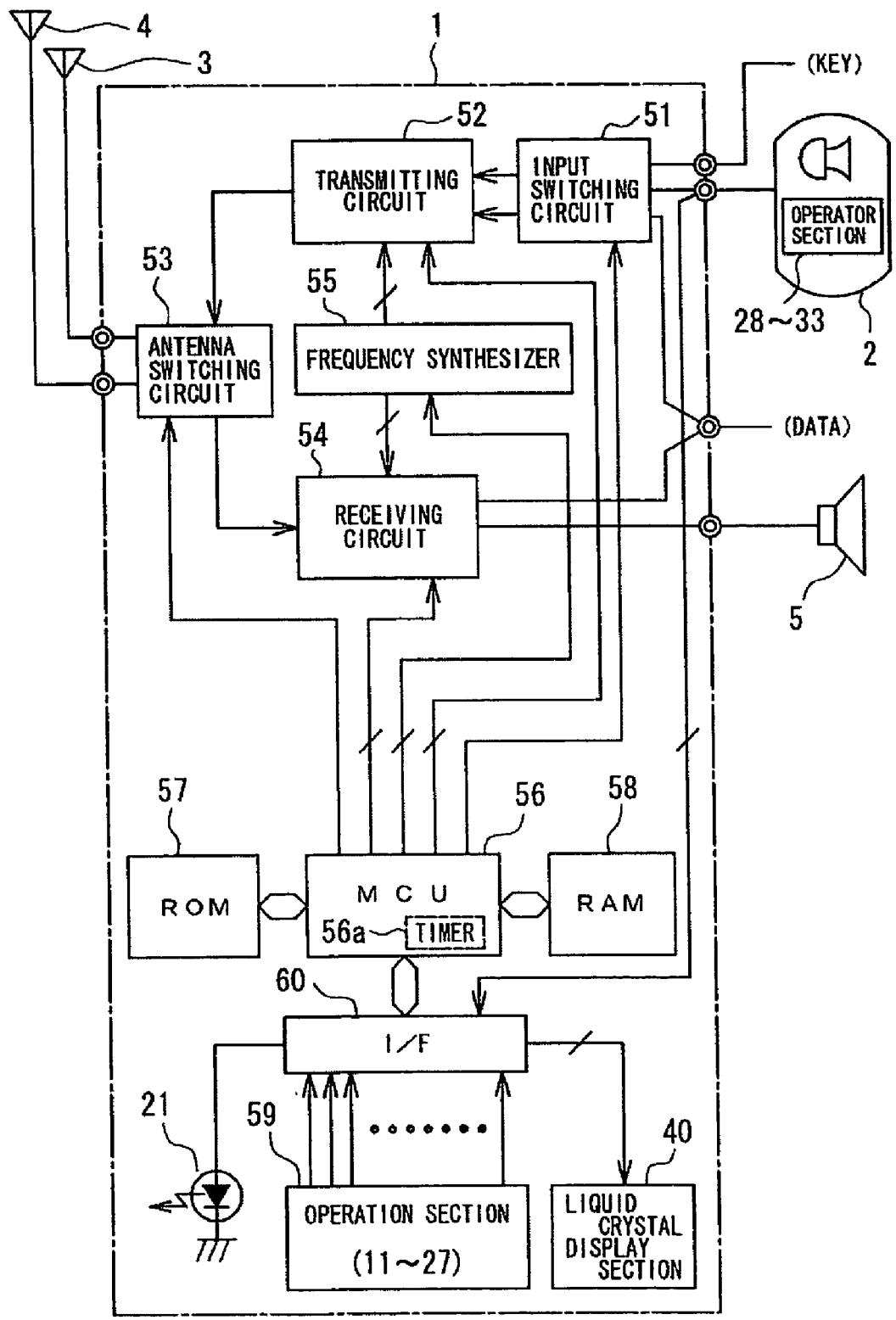
FIG. 1 is a schematic system block diagram of a radio transmitter-receiver according to an embodiment of the present invention.
Figure 6:
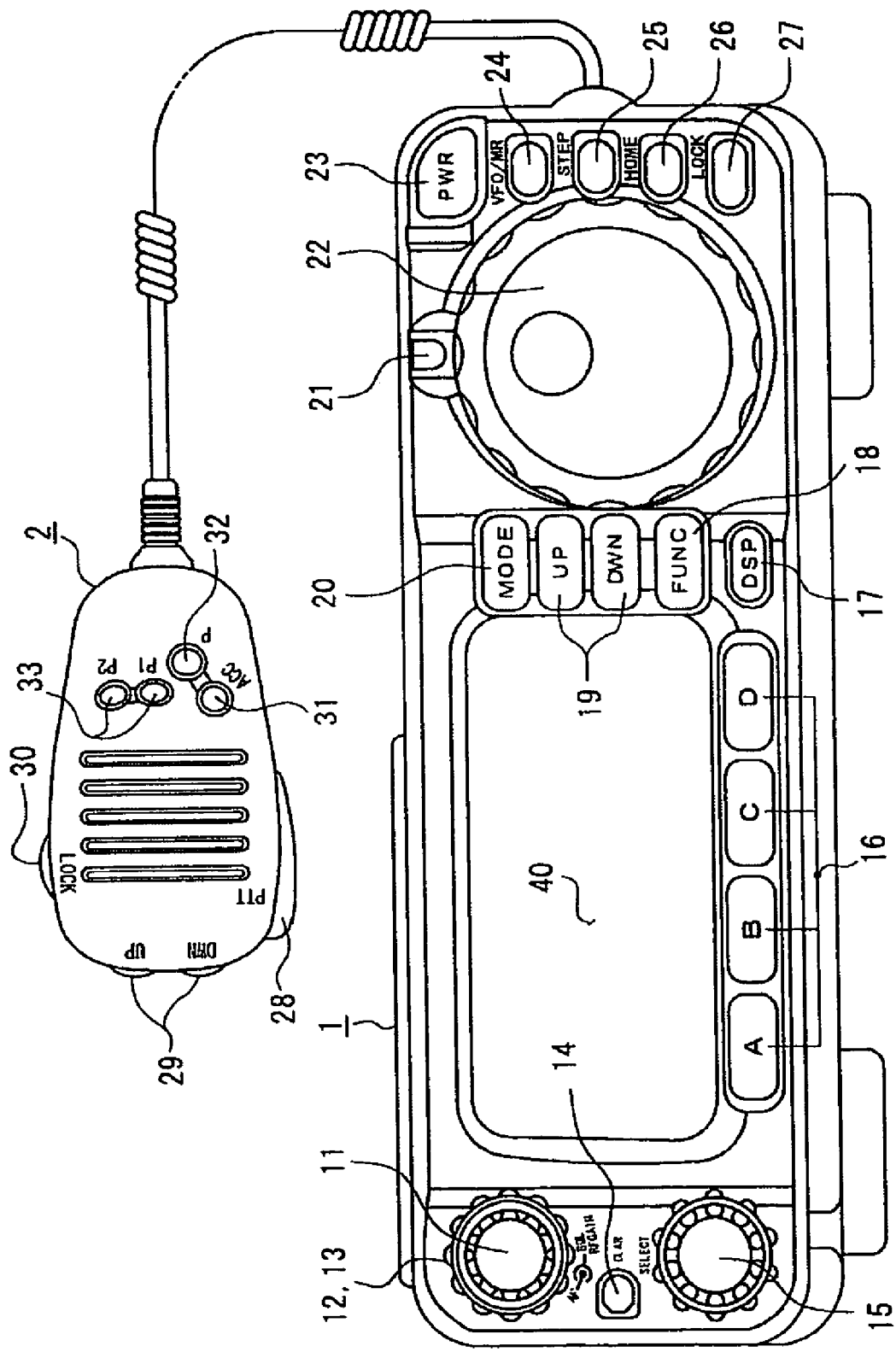
FIG. 6 is a top view of the radio transmitter-receiver.

First, FIG. 1 is a schematic system block diagram of the radio transmitter-receiver in FIG. 6, described before.

As shown in FIG. 6, the microphone 2 is connected to the main unit 1 through a microphone jack. In addition, connectors for connecting antennas 3 and 4 that are selected according to a frequency band, a connector for connecting keys (KEYs), an input/output connector for data (DATA), and a connector for connecting a loudspeaker 5 are disposed on the rear and side surfaces of the main unit 1. FIG. 1 schematically shows the radio transmitter-receiver including these components.

Referring to FIG. 1, reference numeral 51 denotes an input switching circuit for performing switching between a key input and a microphone input. Reference numeral 52 denotes a transmitting circuit including functional modules for transmission, such as a modulator, a BPF, a mixer, an exciting amplifier, and a power amplifier, reference numeral 53 denotes an antenna switching circuit for switching uses of the antennas 3 and 4. Reference numeral 54 denotes a receiving circuit including functional modules for reception, such as a high-frequency amplifier, a mixer, a BPF, an IF amplifier, a demodulator, and a low-frequency amplifier. Reference numeral 55 denotes a frequency synthesizer for supplying a signal of a local oscillation frequency to each of the mixers, modulators, and demodulators in the transmitting circuit 52 and the receiving circuit 54 to make frequency settings and perform modulation. Reference numeral 56 denotes an MCU (micro controller unit) for controlling functional modules in the transmitting and receiving circuits and an entire system including operation and display circuits, which will be described later. Reference numeral 57 denotes a ROM that stores various control programs to be performed by the MCU 56 and necessary, fixed data. Reference numeral 58 denotes a RAM for storing updated data.

Reference numeral 59 denotes an operator section on which the switches and knobs 11 to 27 are mounted, reference numeral 21 denotes an indicator lamp, and reference numeral 40 denotes a liquid crystal display section. The MCU 56 receives an operation command input signal from the switches and knobs 11 to 27 on the operator section 59 and the switches 28 to 33 contained in the microphone 2 through the input/output interface (I/F) 60. The MCU 56 controls the indicator lamp 21 and transfers display data to the liquid crystal display section 40 through the I/F 60.

Accordingly, the basic circuit structure of the radio transmitter-receiver described above is not so different from a normal radio transmitter-receiver. However, this embodiment is characterized in that control programs in "a status registration mode" and a "status confirmation mode", associated with functional settings for the system are stored in the ROM 57, and that a data table used for executing these control programs is stored in the RAM 58.

Next, operation procedures in the above-mentioned modes will be described with reference to the data table and flowcharts illustrated in FIG. 2 to FIG. 5, one after another.

Figures 2, 3:
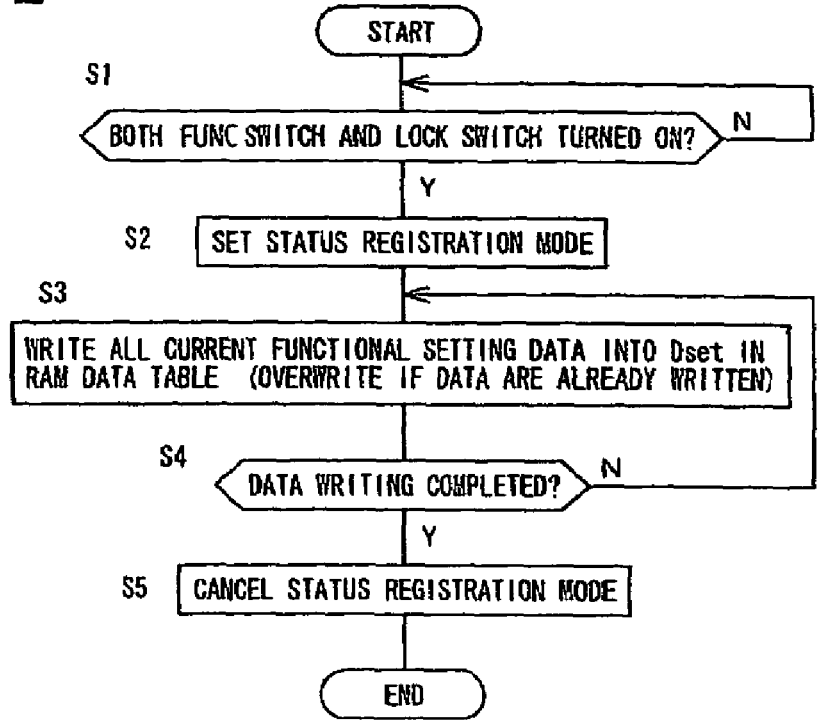
FIG. 2 is a flowchart showing an operation procedure in a status registration mode.
FIG. 3 is a RAM data table.

First, the flowchart in FIG. 2 shows the operation procedure in the status registration mode.

If an operator turns ON the FUNC switch 18 and the LOCK switch 27 or 30 simultaneously during the operation of the system in step S1, the MCU 56 detects the operation command input through the I/F 60. Then, the MCU 56 sets the status registration mode by an interrupt and executes the control program associated with this mode in step S2.

For the operation of the system, the MCU 56 controls various functional modules in the transmitting circuit 52 and the receiving circuit 54, the local oscillation frequencies from the frequency synthesizer 55, and the connection statuses of the input switching circuit 51 and the antenna switching circuit 53, according to operation command inputs from the switches and knobs 11 to 27 on the operator section 59 and the switches 28 to 33 in the microphone 2. The MCU 56 thereby makes various functional settings corresponding to transmitting and receiving conditions that have been commanded and selected. If the status registration mode described above is set, the MCU 56 detects functional setting data at that point, and writes it in the data table in the RAM 58 in step S3.

Namely, as shown in FIG. 3, the data table in the RAM 58 is configured such that two data cells Dset and Dref are provided, corresponding to respective functional items associated with the transmitting and receiving conditions. In this status registration mode, the MCU 56 writes functional setting data in the data cell Dset in the data table.

The functional items in the table are associated with the transmitting and receiving conditions that are modified and set according to the types of the operation of the radio transmitter-receiver. In this embodiment, a MODE (radio mode), a FREQ (T) (transmitting frequency), FREQ(R) (receiving frequency), a VFO/MR (VFO scanning function/ memory channel scanning function), a STEP (frequency adjustment step), a DSP (selection of the DSP NR/DSP AUTO NOTCH/DSP BPF mode), an AF VOL (received sound volume), an SQL (squelch ON/OF), RF GAIN (receiving circuit gain), a CLAR (clarifier ON/OFF), an IF SHIFT (shift function ON/OFF) are provided as the functional items.

If the functional setting data is already written in the data cell Dset, it is updated by overwriting.

Then, if the data writing is completed in step S4, the MCU 56 cancels the status registration mode. Then, the system returns to its original state in step S5.

In other words, this status registration mode is set for the occasion of the change of operator, and is used to record the transmitting and receiving conditions at the point of operator change in the data table.

After the operator change, an operator who performs communication thereafter may modify the transmitting and receiving conditions or set new transmitting and receiving conditions by means of the operator section 59 and the switches 28 to 33 in the microphone 2.

Thus, when the initial operator has returned for the change to resume communication, functional settings associated with the original transmitting and receiving conditions would not always remain the same.

In this case, the initial operator turns on the FUNC switch 18 and the HOME switch 26 simultaneously to set the status confirmation mode. In this case, it should be arranged that the status registration mode is set by the initial operator alone for the occasion when the change to the initial operator is made.

Figure 4:
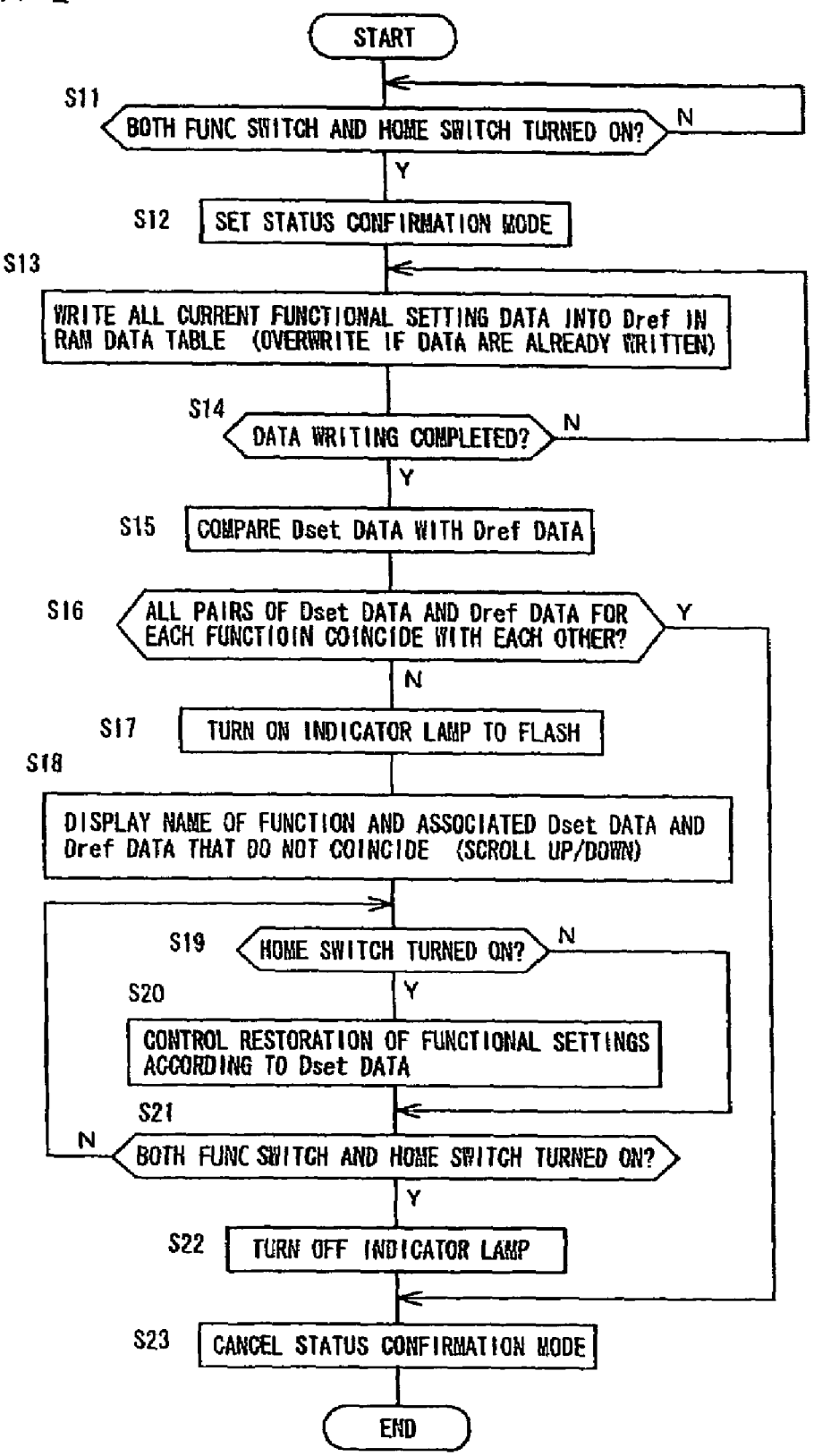
FIG. 4 is a flowchart showing an operation procedure in a status confirmation mode.

An operation procedure in this status confirmation mode is shown in a flowchart in FIG. 4. According to the mode setting operation, the MCU 56 interrupts the procedure of the system to execute the control program in the status confirmation mode in steps S11 and S12.

For execution of the control program, the MCU 56 first detects all functional setting data at that point, as in the status registration mode, and then writes them in the Dref (refer to FIG. 3) in the data table in the RAM 58 in step S13. If the data is already written in the Dref of the data table, it is updated by overwriting.

Thus, the functional setting data for the occasion of the future change to the initial operator is stored in the Dset of the data table, while the functional setting data at the current point of the operator is stored in the Dref, both corresponding to respective functional items.

Then, upon completion of data writing into the Dref of the data table in step S14, the MCU 56 makes comparisons between the functional setting data in the Dset and the functional setting data in the Dref, for respective functional items, to determine whether all pairs of functional setting data in the Dset and the Dref coincide in steps S15 and S16.

If all pairs of the functional setting data in the Dset and the Dref are determined to coincide, the status confirmation mode is terminated in steps S16 and S23. If a functional item is detected for which functional setting data in the Dset does not coincide with the corresponding one in the Dref, the MCU 56 supplies a control signal to the indicator lamp 21 through the I/F 60 to cause the indicator lamp 21 to flash in steps S16 and S17.

Accordingly, if the indicator lamp 21 does not flash, the initial operator can confirm that the operator who has performed communication thereafter did not modify the original functional settings. For this reason, he can confirm that communication can be resumed with the original functional settings remain unmodified.

On the other hand, if the indicator lamp 21 flashes, it means that one or more of the functional settings has been modified. However, it cannot be known what functional setting associated with which functional item has been modified.

Thus, in this embodiment, the MCU 56 reads out a functional item and functional setting data associated with the functional item in the Dset and the Dref that do not coincide, from the data table in the RAM 58. Then, the MCU 56 transfers them to the liquid crystal section 40 through the I/F 60 for display in step S18.

To take an example, if functional setting data in the Dset in the status registration mode and functional setting data in the Dref in the status confirmation mode are as shown in FIG. 3, it means that functional items indicated by arrows have been modified. Consequently, display of FREQ (T):

144.86 MHz→145.53 MHz, FREQR: 144.86 MHz→144.94 MHz, AF VOL: 32.05 dB→48.74 dB, CLAR: OFF→ON, and IF SHIFT:ON→OFF is performed.

Since the liquid crystal display section 40 does not have so large a display area, the UP and DOWN switches 19 are employed for scrolling so as to allow confirmation of all functional item data that has been modified.

Next, the operator, who has confirmed from the liquid crystal display section 40 that modification of functional settings has been made, turns on the HOME switch 26 in step S19, if it is necessary to restore the current functional settings to their original states.

In this case, the MCU 56 regards a signal indicating turning ON of the HOME switch 26 in the state confirmation mode as a command for restoration. Then, according to the displayed functional setting data in the Dset associated with the functional items, the MCU 56 controls the functional modules of the transmitting circuit 52 and the receiving circuit 54 associated with the functional items. Then, the MCU 56 thereby automatically restores the current functional settings to their original states in step S20.

If communication is then resumed in the restored original states, the operator should turn on the FUNC switch 18 and the HOME switch 26 simultaneously in step 21, as in the case where the state confirmation mode has been set. If communication is to be carried on in the state where modification of the functional settings was performed, the operator should turn on the FUNC switch 18 without turning on the HOME switch 26. In response to the operation command signal, the MCU 56 turns off the indicator lamp 21 and then cancels the status confirmation mode in steps S22 and S23.

Thus, according to the status confirmation mode, when the operator resumes communication, it can be checked from the state of the indicator lamp 21 whether the current functional settings are modified from the functional settings previously stored in the status registration mode. Further, if modification has been performed, it can be confirmed which functional item is modified. Then, restoration to the original functional settings can be performed by a simple operation, if necessary.

Incidentally, the status registration mode in FIG. 2 described above is set as required, for the occasion of the operator change, for example. The status registration mode is not effective in the case the immediately preceding functional settings are to be restored after an unintended erroneous operation has been performed.

In other words, even if the operator who has changed performs modification of functional settings associated with transmitting and receiving conditions at will, restoration to the state at the point of the operator change alone can be performed. Restoration of functional settings to their preceding state immediately before the occurrence of an unintended erroneous operation is not guaranteed.

Figure 5:
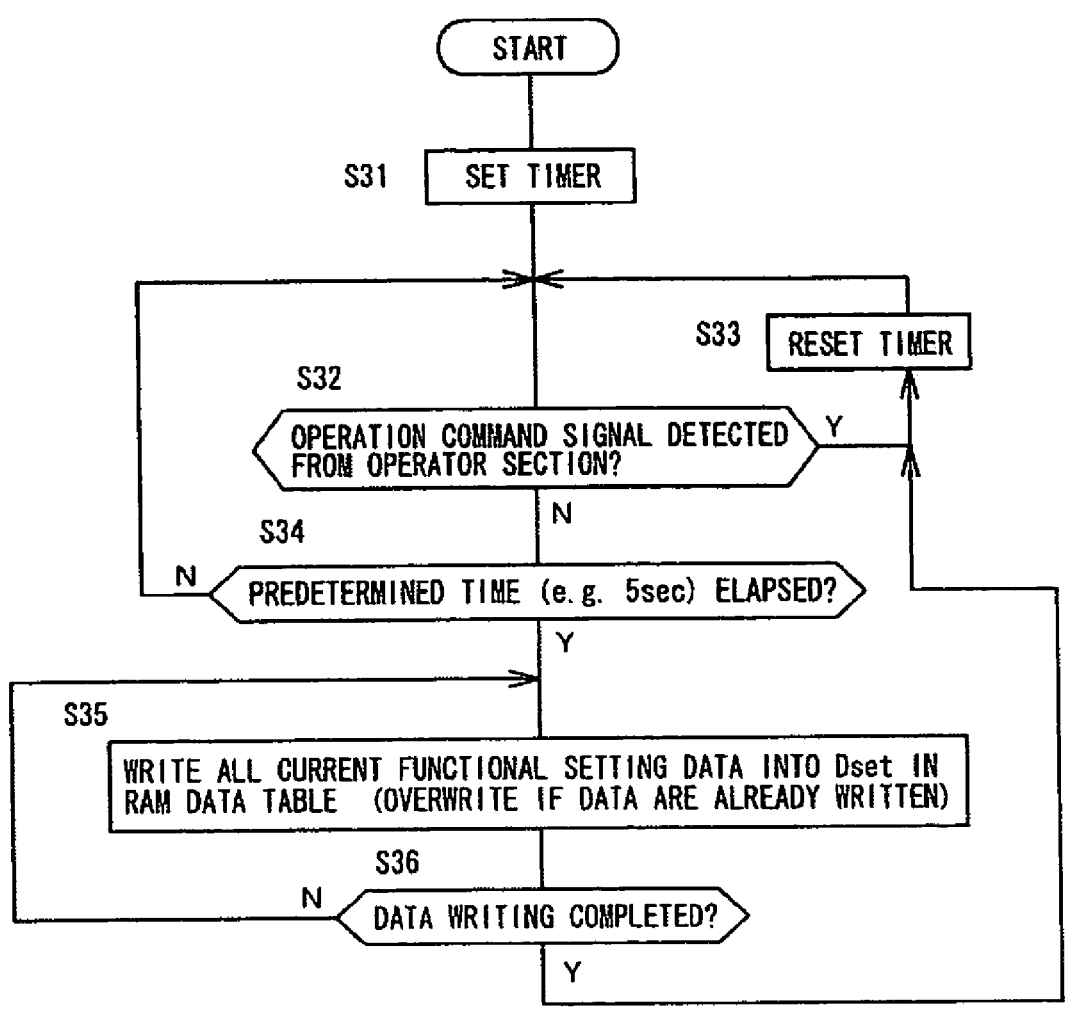
FIG. 5 is a flowchart showing an procedure of periodically performing an automatic registration process for functional settings.

In order to address this problem, use of a periodically automatic registration process in combination with the state confirmation mode as shown in a flowchart in FIG. 5, in place of the state registration mode set by manipulating the FUNC and LOCK switches, is effective.

First, when the radio transmitter-receiver system is powered up, the MCU 56 activates a built-in timer 56*a* in step S31. Then, the MCU 56 monitors whether an operation command signal has been detected from the operator section 59 or the switches 28 to 33 in the microphone 2 through the I/F 60 in step S32.

If the operation command signal has been detected, the MCU 56 resets the timer 56*a* in steps S32, S33, and then S32. If a predetermined time such as five seconds has elapsed with no operation command signal detected in step S34, the MCU 56 writes functional setting data at that point into the Dset in the data table of the RAM 58 in step S35, as in the case of the status registration mode.

In this case, except in the initial state, data is already written. Thus, in order to update the data, overwriting is performed.

Then, upon completion of data writing in step S36, the MCU 56 resets the timer 56*a* in step S33. Thereafter, the MCU 56 repeats the operations of steps S32 to S36 for execution of operations in steps S33 and S32.

Accordingly, if the before-mentioned status confirmation mode in FIG. 4 is set immediately after the occurrence of an unintended erroneous operation, the contents of the unintended erroneous operation can be confirmed, and functional settings can be returned to the state immediately before the unintended erroneous operation has been performed. Thus, communication can be continued smoothly without interruption.

Incidentally, when the periodically automatic registration process is selectively set in combination with the status registration mode described above, combinations of various switches which are not used by the system, may be allocated to issue a command for the selection. Then, either one of the periodically automatic registration process and the status registration mode should be executed, as required.

In the above embodiment, the description was directed to the radio transmitter-receiver. The present invention, however, can be applied to transmitters and receivers separately as well.

Further, in this embodiment, if modification of any of functional settings has been identified in the status confirmation mode, notification is made by flashing of the indicator lamp 21. Notification by a beep sound or display of a message on the liquid crystal display section 40, for example, may also employed.

Still further, in this embodiment, the status registration mode and the status confirmation mode are set by the use of combinations of the switches. A dedicated switch, however, may be provided and may also be employed for making a setting operation.

Those skilled in the art will recognize further variations are possible within the scope claimed below.

What is claimed is:

1. A multi-function radio communication apparatus comprising:
    an operator control section including at least one actuator corresponding to a control function and selectively configured to appoint a function setting for said control function;
    a data storage area including a first data structure for storing at least one baseline function setting appointed by said at least one actuator and a second data structure for storing at least one detected function setting;
    a microprocessor in communication with said data storage area and said operator control section, said microprocessor being selectively configured to enter into a first mode to record said at least one baseline function setting corresponding to said control function in said first data structure and to enter into a second mode subsequent to said first mode to record said at least one detected function setting corresponding to said control function in said second data structure and compare said settings in said data structures; and an indicator element responsive to a command signal generated from said microprocessor upon a comparison of non-coinciding said data structures to issue a modification notification.

2. The multi-function radio communication apparatus as set forth in claim 1 wherein:
said operator control section includes a plurality of actuators, each actuator corresponding to an individual control function and selectively configured to appoint a function setting for said corresponding control function; and
said microprocessor is selectively configured to record a baseline function setting in said first data structure for each actuator and to record a detected function setting for each actuator and compare said baseline function setting with said detected function setting for each actuator.

3. The multi-function radio communication apparatus as set forth in claim 2 wherein:
said microprocessor includes a first control program responsive to a manipulative combination of said acuators to enter into said first mode.

4. The multi-function radio communication apparatus as set forth in claim 3 wherein:
said microprocessor includes a second control program responsive to a different manipulative combination of said actuators to enter into said second mode.

5. The multi-function radio communication apparatus as set forth in claim 1 wherein:
said actuator is selected from the group consisting of knobs and switches.

6. The multi-function radio communication apparatus as set forth in claim 1 wherein:
said operator control section includes a display section with a menu scrolling actuator with said display section being configured to display at least one result of said comparison in a display menu.

7. The multi-function radio communication apparatus as set forth in claim 4 wherein:
said microprocessor includes a read only memory storing said first and second control programs.

8. The multi-function radio communication apparatus as set forth in claim 1 wherein:
said data storage area includes a data table located in a random access memory.

9. The multi-function radio communication apparatus as set forth in claim 8 wherein:
for each said actuator, said data table includes a first data cell corresponding to said at least one baseline function setting and a second data cell corresponding to said at least one detected function setting.

10. The multi-function radio communication apparatus as set forth in claim 1 wherein:
said actuator is selected from the group consisting of a mode setting, a transmitting frequency setting, a receiving frequency setting, a scanning function, a memory channel scanning function, a frequency adjustment step, a DSP selector mode, a received volume setting, a squelch setting, a receiving circuit gain settings, a clarifier setting for changing a receiving frequency without changing a transmitting frequency, a shift function setting, a selection mode, a multifunction mode, an assigned function mode, an operation band mode, an emission mode, a power mode, a home mode for recalling frequently used frequencies, a lock mode, a PTT function, a call home channel mode, and a frequency shift mode.

11. The multi-function radio communication apparatus as set forth in claim 1 wherein:
said microprocessor overwrites a pre-existing function setting stored in said first data structure with said at least one baseline function setting upon entry of said first mode.

12. The multi-function radio communication apparatus as set forth in claim 1 wherein:
said microprocessor overwrites a pre-existing detected function setting stored in said second data structure with said at least one detected function setting upon entry of said second mode.

13. The multi-function radio apparatus as set forth in claim 1 wherein:
said first mode is initiated by selective manipulation of at least two actuators.

14. The multi-function radio apparatus as set forth in claim 13 wherein:
said second mode is initiated by selective manipulative of at least two actuators, at least one of which is different than said actuators selected to initiate said first mode.

15. The multi-function radio communication apparatus as set forth in claim 1 wherein:
said indicator element is an illumination device and said modification notification is a repeated flashing.

16. The multi-function radio communication apparatus as set forth in claim 6 wherein:
upon comparison of said non-coinciding data structures, said microprocessor is programmed to display a baseline function setting and a corresponding changed detected function setting on said display.

17. The multi-function radio communication apparatus as set forth in claim 16 wherein:
a plurality of said baseline function settings and corresponding changed detected function settings are displayed in a menu on said display; and
said microprocessor is responsive to a scrolling actuator to display additional menu items on said display.

18. The multi-function radio communication apparatus as set forth in claim 1 wherein:
said operator section includes a restoration actuator in communication with said microprocessor;
said microprocessor, upon actuation of said restoration actuator automatically restores said at least one detected function setting to match said at least one baseline function setting stored in said first data structure.

19. The multi-function radio communication apparatus as set forth in claim 1 wherein:
said microprocessor includes a timer element and is programmed to detect an operation command signal from said operator control section, and upon detecting said operation command signal, said timer element is reset to a predetermined time delay before recording said at least one baseline function setting in said first data structure.

20. A multi-function radio communication apparatus comprising:
an operator control section including a plurality of actuators, each said actuator being selectively configured to appoint a function setting to a corresponding control function;
a data storage area including a first set of data fields for storing a set of baseline function settings appointed by said actuators and a second set of data fields for storing a corresponding set of detected function settings;

a microprocessor in communication with said data storage area and said operator control section, said microprocessor being selectively configured upon manipulation of at least two of said actuators to store said set of baseline function settings in said first set of data fields and to store said corresponding set of detected function settings after said set of baseline function settings are stored in said second set of data fields and compare said sets of data fields to determine if corresponding function settings are non-coinciding;

an indicator element responsive to a command signal generated from said microprocessor upon a comparison of non-coinciding said data structures to issue a modification notification; and a restoration actuator in said operator control section selectively configured to transmit a signal to said microprocessor to reset said second set of data fields to match said first set of data fields.

21. A multi-function radio communication apparatus comprising:

a transmitting circuit with a plurality of transmitting function modules responsive to a set of transmitting function conditions;

a receiving circuit with a plurality of receiving function modules responsive to a set of receiving function conditions;

a function control section including a plurality of function setting actuators, each of said actuators being selectively configured to appoint a function condition in at least one of said circuits;

a microprocessor in communication with said function control section, said microprocessor being selectively configured to enter into a first mode to store an initial set of function conditions appointed by said actuators and to enter into a second mode subsequent to said first mode to store a set of detected function conditions as determined by said actuator settings and compare said stored sets of function conditions;

a data storage area responsive to a status registration command signal from said microprocessor to store said initial set of function conditions as determined by said actuator settings and further responsive to a status confirmation command signal from said microprocessor to store said set of detected function conditions provided by said microprocessor; and an indicator element responsive to a command signal generated from said microprocessor upon a comparison of non-coinciding said initial set of function conditions with said set of detected function conditions to issue a modification notification.

* * * * *